US009596139B1

(12) United States Patent
Bernstein et al.

(10) Patent No.: US 9,596,139 B1
(45) Date of Patent: Mar. 14, 2017

(54) NETWORK SYSTEM AND METHOD FOR DETECTION AND CORRECTION OF DUPLEX MISMATCH INCLUDING DUPLEX MODE DETERMINATION

(71) Applicant: Marvell International LTD., Hamilton (BM)

(72) Inventors: Robert C. Bernstein, Belmont, CA (US); Jonathan R. Pannell, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 298 days.

(21) Appl. No.: 14/450,605

(22) Filed: Aug. 4, 2014

Related U.S. Application Data (60) Provisional application No. 61/864,225, filed on Aug. 9, 2013.

(51) Int. Cl.
  *H04L 5/16* (2006.01)
  *H04L 12/24* (2006.01)
  *H04L 12/413* (2006.01)

(52) U.S. Cl.
  CPC ............ *H04L 41/0873* (2013.01); *H04L 5/16* (2013.01); *H04L 12/413* (2013.01); *H04L 41/083* (2013.01)

(58) Field of Classification Search
  None
  See application file for complete search history.

(56) References Cited

U.S. PATENT DOCUMENTS

| 4,939,724 A | 7/1990 | Ebersole |
| 5,961,619 A | 10/1999 | Voloshin |

(Continued)

FOREIGN PATENT DOCUMENTS

| GB | 2 355 373 A | 4/2001 |
| JP | 2000106585 A | 4/2000 |

(Continued)

OTHER PUBLICATIONS

International Search Report for related PCT Application No. PCT/US2007/004095 mailed Sep. 17, 2007; 3 pages.

(Continued)

*Primary Examiner* — Wei Zhao
*Assistant Examiner* — Ronald H Davis (57) ABSTRACT

A first network device including a link module, a collision module, an auto-negotiation module, and a duplex module. The link module generates a first parameter based on whether a link is established between the first network device and a second network device. The collision module generates a second parameter based on whether a collision between transmitted signals has occurred as a result of transmitting data from the first network device to the second network device while transmitting other data from the second network device to the first network device. The auto-negotiation module generates a third parameter based on whether an auto-negotiation procedure has been performed between the first and second network devices. The duplex module, based on the first, second, and third parameters, determines a duplex mode of the first network device or the second network device or transitions the first network device between half-duplex and full-duplex mode.

20 Claims, 4 Drawing Sheets

(56) References Cited

U.S. PATENT DOCUMENTS

| | | | | |
|---|---|---|---|---|
| 6,078,591 | A * | 6/2000 | Kalkunte | H04L 12/413 370/448 |
| 6,580,697 | B1 | 6/2003 | Gardner et al. | |
| 6,665,275 | B1 * | 12/2003 | Davy | H04L 12/40032 370/282 |
| 6,938,086 | B1 * | 8/2005 | Banga | H04L 5/1438 370/276 |
| 7,088,921 | B1 | 8/2006 | Wood | |
| 7,660,272 | B1 * | 2/2010 | Lo | H04L 12/40136 370/278 |
| 8,089,907 | B2 | 1/2012 | Pannell et al. | |
| 8,705,416 | B2 | 4/2014 | Pannell et al. | |
| 2002/0120731 | A1 * | 8/2002 | Walker | H04L 41/0856 709/223 |
| 2005/0083930 | A1 | 4/2005 | Chen et al. | |
| 2005/0094658 | A1 | 5/2005 | Chen et al. | |
| 2005/0207360 | A1 * | 9/2005 | Costo | H04L 1/0002 370/282 |
| 2006/0005102 | A1 * | 1/2006 | Scaglione | H04L 41/0681 714/758 |
| 2006/0039399 | A1 * | 2/2006 | Ejima | H04L 12/40136 370/445 |
| 2006/0280132 | A1 * | 12/2006 | Connor | H04L 5/14 370/276 |
| 2006/0280133 | A1 * | 12/2006 | Nomura | H04L 12/40136 370/276 |
| 2007/0230550 | A1 * | 10/2007 | Curran-Gray | H04L 41/0654 375/224 |
| 2008/0089249 | A1 * | 4/2008 | Young | H04L 5/16 370/276 |

FOREIGN PATENT DOCUMENTS

| | | |
|---|---|---|
| JP | 2003258939 A | 9/2003 |
| WO | WO-2007126479 A1 | 11/2007 |

OTHER PUBLICATIONS

International Preliminary Report on Patentability and Written Opinion of the International Searching Authority for related PCT Application No. PCT/US2007/004095 mailed Sep. 30, 2008; 8 pages.
Network Computing, Ethernet Error Description, Nov. 15, 1996, Network Computing.
Oppenheimer et al., Troubleshooting Campus Networks, 2002, John Wiley and Sons, pp. 65-68.
ANSI/IEEE Std. 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 531 pages.
IEEE P802.11g/D8.2, Apr. 2003 (Supplement to ANSI/IEEE Std. 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/MAN Standards Committee of the IEEE Computer Society; 69 pages.
IEEE 802.20-PD-06, IEEE P802.20 V14, Jul. 16, 2004, Draft 802.20 Permanent Document, System Requirements for IEEE 802.20 Mobile Broadband Wireless Access Systems—Version 14, 24 pages.

IEEE Std. 802.11a-1999 (Supplement to IEEE Std. 802.11-1999) [Adopted by ISO/IEC and re-designated as ISO/IEC 8802-11: 1999/Amd 1:2000(E)]; Supplement to IEEE Standard for Information technology—Telecommunications and information exchange between systems—Local and metropolitan area networks—Specific requirements—Part 11: Wireless LAN Medium Access Control (MAC) Physical Layer (PHY) specifications High-speed Physical Layer in the 5 GHz Band; LAN/MAN Standards Committee of the IEEE Computer Society; 91 pages, Sep. 16, 1999.
IEEE Std. 802.11b-1999 (Supplement to IEEE Std. 802.11-1999 Edition); Supplement to IEEE Standard for Information technology—Telecommunications and information exchange between systems—Local and metropolitan area networks—Specific Requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.
IEEE Std. 802.11b-1999/Cor Jan. 2001 (Corrigendum to IEEE Std. 802.11-1999); IEEE Standard for Information technology—Telecommunications and information exchange between systems—Local and metropolitan area networks—Specific Requirements—Part 11:Wireless LAN Medium Access Control (MAC) and Physical Layer (PHY) specifications Amendment 2: Higher-Speed Physical Layer (PHY) Extension in the 2.4 GHz Band—Corrigendum 1; LAN/MAN Standards Committee of the IEEE Computer Society; Nov. 7, 2001; 23 pages.
802.11n; IEEE P802.11-04/0889r6; Wireless LANs, TGn Sync Proposal Technical Specifications; 134 pages, May 18, 2005.
IEEE Std. 802.16-2004 (Revision of IEEE Std 802.16-2001) IEE Standard for Local and metropolitan area networks; Part 16: Air Interface for Fixed Broadband Wireless Access Systems; IEEE Computer Society and the IEEE Microwave Theory and Techniques Society; Oct. 1, 2004; 896 pages.
IEEE Std. 802.3-2002 (Revision of IEEE 802.3, 2000 Edition); IEEE Standard for Information technology—Telecommunications and information exchange between systems—local and metropolitan area networks—Specific requirements Part 3: Carrier Sense Multiple Access with Collision Detection (CSMA/CD) access method and physical layer specifications; Section One; IEEE Computer Society; Sponsored by the LAN/MAN Standards Committee; Mar. 8, 2002; 580 pages.
IEEE Std. 802.3-2002 (Revision of IEEE 802.3, 2000 Edition); IEEE Standard for Information technology—Telecommunications and information exchange between systems—local and metropolitan area networks—Specific requirements Part 3: Carrier Sense Multiple Access with Collision Detection (CSMA/CD) access method and physical layer specifications; Section Two; IEEE Computer Society; Sponsored by the LAN/MAN Standards Committee; Mar. 8, 2002; 582 pages.
IEEE Std. 802.3-2002 (Revision of IEEE 802.3, 2000 Edition); IEEE Standard for Information technology—Telecommunications and information exchange between systems—local and metropolitan area networks—Specific requirements Part 3: Carrier Sense Multiple Access with Collision Detection (CSMA/CD) access method and physical layer specifications; Section Three; IEEE Computer Society; Sponsored by the LAN/MAN Standards Committee; Mar. 8, 2002; 382 pages.
PCT International Search Report and Written Opinion dated Sep. 17, 2007 for International Application No. PCT/US2007/004095; 14 pages.
Office Action issued in the corresponding Chinese Patent Application No. 200780019972.3, dated May 5, 2011, 14 pages.

* cited by examiner

NETWORK SYSTEM AND METHOD FOR DETECTION AND CORRECTION OF DUPLEX MISMATCH INCLUDING DUPLEX MODE DETERMINATION

CROSS-REFERENCE TO RELATED APPLICATIONS

This application claims the benefit of U.S. Provisional Application No. 61/864,225, filed on Aug. 9, 2013. The entire disclosure of the application referenced above is incorporated herein by reference.

FIELD

The present disclosure relates to devices operating in half-duplex and full-duplex modes and more particularly to duplex mismatch between network devices.

BACKGROUND

Two network devices that are linked to communicate with each other may operate in a half-duplex mode or a full-duplex mode. Operation in a half-duplex mode refers to only one of the network devices transmitting frames of data (hereinafter referred to as "frames") at any moment in time. Operation in a full-duplex mode refers to the first network device transmitting frames to the second network device while the second network device is transmitting frames to the first network device.

Duplex mismatch can occur between linked network devices communicating with each other over a network (e.g., an Ethernet local area network) and operating in different duplex modes. For example, a first network device can operate in a half-duplex mode while a second network device is operating in a full-duplex mode. The first network device cannot send frames to the second network device while the second network device is sending frames to the first network device. In addition, the second network device can at any moment in time send frames to the first network device regardless of whether the first network device is sending frames to the second network device. This causes collisions between signals transmitted between the network devices and results in receiver errors at the first network device for the frames transmitted from the second network device (forced full duplex network device). This is because the second network device can only receive a portion of the frames transmitted by the first network device as a result of transmission by the first network device being cut off by transmission from the second network device.

Due to the duplex mismatch, few frames, transmitted from the first network device operating in the half-duplex mode, are successfully transmitted and received at the second network device operating in the full-duplex mode. During a period of duplex mismatch, data transfer rates for successful transmissions can be as low as 1% of a maximum transfer rate or available bandwidth. During a period of duplex mismatch, the data transfer rate may be 1 Mb/s. Thus, duplex mismatch can result in slow data transfer rates and/or corresponding stalling problems.

Duplex mismatch can occur often due to the protocols executed according to Institute of Electrical and Electronic Engineers (IEEE) standards supporting category (CAT) 3, 5 and 5e twisted pair cables for establishing a link between network devices. These standards have evolved. Initially the only Ethernet standard for establishing a link over a twisted-pair cable was 10BASE-T (referring to a data transfer rate of 10 Mb/s). Network devices using the 10BASE-T standard operated only in the half-duplex mode. Operation in the full-duplex mode was then developed to increase network performance. This included allowing operation in the full-duplex mode only if both network devices communicating with each other were capable of operating in the full-duplex mode. Auto-negotiation was performed to determine if both network devices were capable of operating in the full-duplex mode. Auto-negotiation includes the network devices exchanging information to determine the transmission capabilities of each other and to negotiate, for example, a transmission speed at which the network devices are to transmit frames. The exchanged information of each of the network devices can include maximum transmission speeds, communication protocols, communication channels, etc.

Rules were developed to insure interoperability of new equipment with pre-existing equipment. For example, network devices capable of operating in the full-duplex mode were designed to also communicate with devices operating in the half-duplex mode. One of the rules included a first network device, capable of operating in the full-duplex mode, operating in the half-duplex mode if a link partner (or second network device) does not auto-negotiate. This insured backwards compatibility with network devices that only operated in the half-duplex mode and did not support auto-negotiation.

As technology evolved, Fast Ethernet (or 100BASE-TX) became an IEEE standard for transmitting at 100 Mb/s. The first devices capable of supporting Fast Ethernet only operated in the half-duplex mode and did not auto-negotiate. These first devices performed a "parallel detect" procedure to allow the first devices to communicate with other devices at a correct speed (e.g., 10 Mb/s or 100 Mb/s). Parallel detect allows a first network device to transmit and receive frames to and from a link partner at a particular speed without having previously performed auto-negotiation with the link partner. Parallel detect includes examining an idle pattern of a link between the first network device and the link partner and based on the detected pattern determining a speed at which to transmit data. Since transmission protocols for the 10 Mb/s and 100 Mb/s data transmission rates exhibit different idle patterns, a network device performing the parallel detect procedure can determine a speed at which the link partner is capable of communicating and transmit data at that speed (e.g., 10 Mb/s or 100 Mb/s).

Complexity of auto-negotiation can affect whether two link partners auto-negotiate correctly, which can cause interoperability problems. To address the interoperability problems associated with auto-negotiation, another rule was developed, which induced forcing (i.e. commanding) a network device to operate at a particular speed and in a particular duplex mode.

Although these rules solved the respective problems for which the rules were designed, the rules collectively created the problem of duplex mismatch. For example, duplex mismatch can occur if a first network device, capable of auto-negotiating, connects to a second network device performing a parallel detect procedure. To maximize performance, the second network device may perform the parallel detect procedure to force the second network device to communicate at a particular speed and in the full-duplex mode. Since the second network device is forced to operate in the full-duplex mode and does not auto-negotiate, the first network device assumes the lowest common operating mode and operates in a half-duplex mode. This results in poor performance because duplex mismatch occurs and the effective data transmission rate is low.

Table 1 shows six possible combinations of transmission speed and duplex mode and corresponding effective data transmission rates for links (i) operating under the 10BASE-T and 100BASE-TX standards, and (ii) using TCP/IP protocols.

TABLE 1

| Row # | Link Speed | Duplex Mode State of Link Partners | Effective Data Transmission Rate |
|---|---|---|---|
| 1 | 100 Mb/s | Both Link Partners Operating in Full-duplex Mode | 100 Mb/s |
| 2 | 100 Mb/s | Both Link Partners Operating in Half-duplex Mode | ~50 Mb/s |
| 3 | 10 Mb/s | Both Link Partners Operating in Full-duplex Mode | 10 Mb/s |
| 4 | 10 Mb/s | Both Link Partners Operating in Half-duplex Mode | ~5 Mb/s |
| 5 | 100 Mb/s | Duplex Mismatch | ~1 Mb/s |
| 6 | 10 Mb/s | Duplex Mismatch | ~0.1 Mb/s |

If only rows 1-4 of Table 1 are considered and both link partners perform a parallel detect procedure resulting in both link partners operating in full-duplex mode, then performing the parallel detect procedures provides good performance. However, if one of the link partners does not perform a parallel detect procedure and attempts to auto-negotiate, duplex mismatch can occur due to the one of the link partners ending up operating in the half-duplex mode. This can result in poor performance and the data transmission rates shown in rows 5-6 of Table 1. The data transmission rates shown in rows 5-6 of Table 1 are less than the data transmission rates for links properly configured for half-duplex operation (shown in rows 2 and 4 of Table 1).

SUMMARY

A first network device is provided and includes a link module, a collision module, an auto-negotiation module, and a duplex module. The link module is configured to generate a first parameter based on whether a link is established between the first network device and a second network device. The collision module is configured to generate a second parameter based on whether a collision between transmitted signals has occurred as a result of (i) first data being transmitted from the first network device to the second network device while (ii) second data is transmitted from the second network device to the first network device. The auto-negotiation module is configured to generate a third parameter based on whether an auto-negotiation procedure has been performed between the first network device and the second network device. The duplex module is configured to, based on the first parameter, the second parameter, and the third parameter, (i) determine a duplex mode of the first network device, (ii) determine a duplex mode of the second network device, or (ii) transition the first network device between a half-duplex mode and a full-duplex mode.

In other features, a method is provided and includes: generating a first parameter based on whether a link is established between a first network device and a second network device; generating a second parameter based on whether a collision between transmitted signals has occurred as a result of (i) first data being transmitted from the first network device to the second network device while (ii) second data is transmitted from the second network device to the first network device; and generating a third parameter based on whether an auto-negotiation procedure has been performed between the first network device and the second network device. The method further includes, based on the first parameter, the second parameter, and the third parameter, (i) determining a duplex mode of the first network device, (ii) determining a duplex mode of the second network device, or (ii) transitioning the first network device between a half-duplex mode and a full-duplex mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

In the drawings, reference numbers may be reused to identify similar and/or identical elements.

DESCRIPTION

Duplex mismatch can occur, for example, between (i) a first network device (e.g., Ethernet switch) attempting to perform auto-negotiation and (ii) a second network device (e.g., a computer, network interface card, or any other Ethernet capable device) performing a parallel detect procedure. The first network device may operate in a half-duplex mode due to unsuccessful auto-negotiation. The second network device does not perform auto-negotiation or bypasses auto-negotiation and, as a result of performing the parallel detect procedure, operates at the detected link speed in a full-duplex mode. Although the first network device detects the speed of the second network device, the first network device may be incapable of detecting whether the second network device is operating in the half-duplex mode or the full-duplex mode. As a result, the first network device operates on half-duplex and a duplex mismatch occurs, which results in link performance not being maximized.

Also, due to the duplex mismatch, the second network device may continuously send frames to the first network device and the first network device may wait for the second network device to become idle before sending frames to the first network device. This further decreases performance of a link. Techniques are disclosed below to minimize periods during which a duplex mismatch exists. The techniques include correcting the duplex mismatches.

Figure 1:
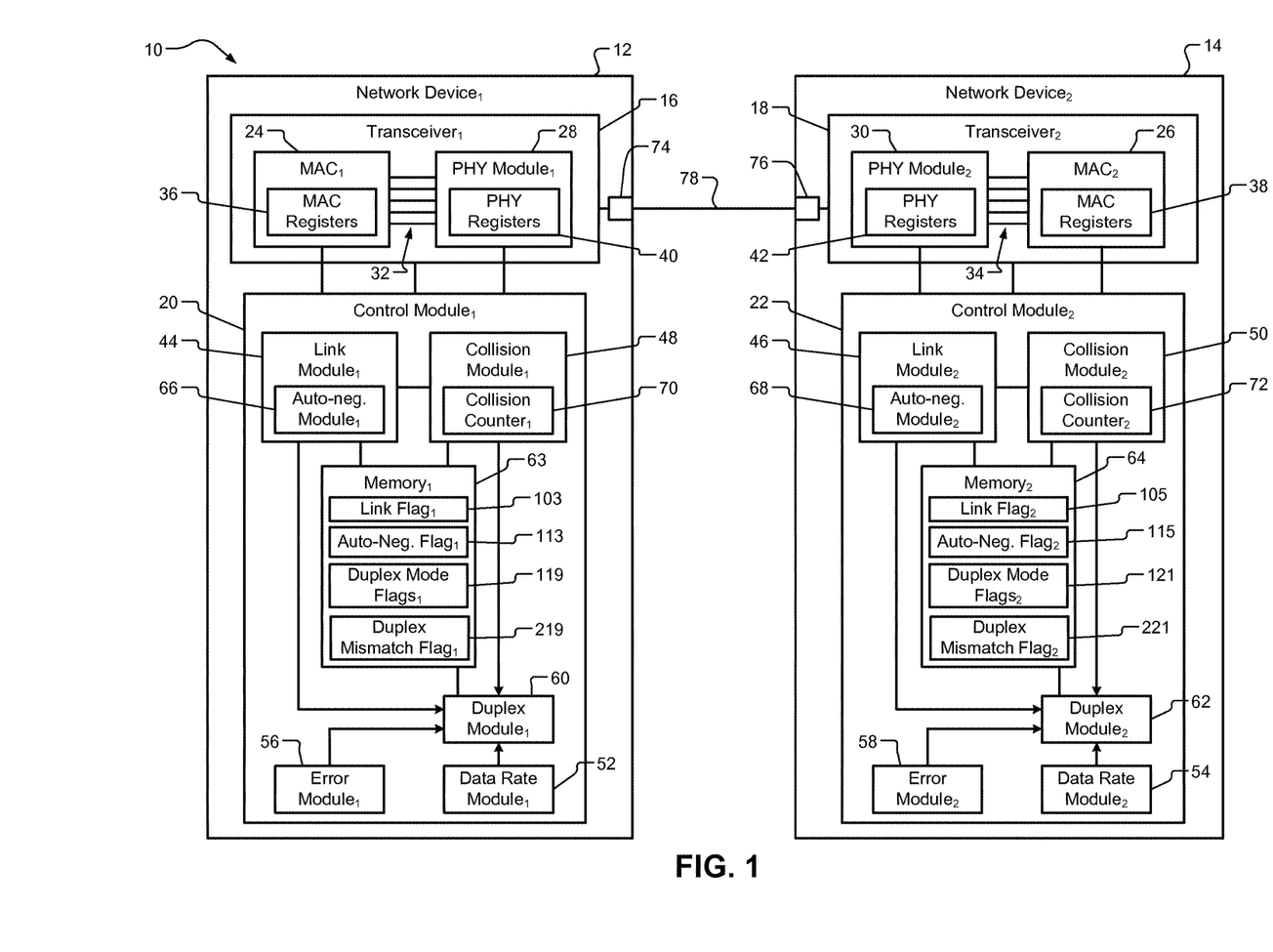
FIG. 1 is functional block diagram of a network system including network devices operating in corresponding duplex modes.

FIG. 1 shows a network system 10. The network system 10 includes network devices 12, 14 communicating with each other over a link (e.g., an IEEE 802.3 Ethernet link) and operating in corresponding duplex modes. As used herein, the term "link" may refer to and/or include one or more channels on which corresponding network devices (or link partners) are communicating with each other. Each of the network devices 12, 14 may be capable of operating in one or both a half-duplex mode and a full-duplex mode.

The network devices 12, 14 may be, for example, computers, switches, routers, or other Ethernet capable devices and may include respective transceivers 16, 18 and control modules 20, 22. The transceivers 16, 18 include media access controllers (MACs) 24, 26 and physical layer (PHY)

modules 28, 30. The MACs 24, 26 may be connected to the PHY modules 28, 30 via serial and/or parallel interfaces 32, 34. The MACs 24, 26 include respective registers 36, 38. The PHY modules 28, 30 include respective registers 40, 42. One or more of the registers 36, 38, 40, 42 may be referred to as remote monitoring (RMON) registers. The control modules 20, 22 include link modules 44, 46, collision modules 48, 50, data rate modules 52, 54, error modules 56, 58, duplex modules 60, 62 and memories 63, 64. The link modules 44, 46 include auto-negotiation modules 66, 68. Each of the collision modules 48, 50 include one or more collision counters 70, 72 (one collision counter is shown for each of the collision modules 48, 50).

The PHY modules 28, 30 may communicate with each other via respective ports 74, 76 over a wired interface 78. The MACs 24, 26 may communicate with the corresponding one of the PHY modules 28, 30 via the respective one of the interfaces 32, 34. The control modules 20, 22 may monitor and control operation of the MACs 24, 26 and PHY modules 28, 30. This control may be based on content in the MAC registers 36, 38 and in the PHY registers 40, 42. During operation, frames may be: transferred from the control modules 20, 22 to the MACs 24, 26; transferred from the MACs 24, 26 to the PHY modules 28, 30; and then finally transmitted via the PHY modules 28, 30 via a link established between the network devices 12, 14. One or more of the control modules 20, 22 may detect a duplex mismatch condition and perform certain tasks to minimize an amount of time during which the duplex mismatch condition exists. Operation of the network devices 12, 14 and correspond devices and modules are further described with respect to the methods of FIGS. 2-4.

Although the modules 44, 46, 48, 50, 52, 54, 56, 58, 60, 62 are shown as being part of the control modules 20, 22, one or more of the modules 44, 46, 48, 50, 52, 54, 56, 58, 60, 62 may be included in the MACs 24, 26 and/or the PHY modules 28, 30. For example, although the collision modules 48, 50 and collision counters 70, 72 are shown as being in the control modules 20, 22, the collision modules 48, 50 and/or one or more of the collision counters 70, 72 may be in the MACs 24, 26. Also, each of the network devices 12, 14 may not include one or more of the above-stated devices and modules. For example, each of the network devices 12, 14 may not include the error modules 56, 58. As another example, the second network device 14 may not include one or more of the link module 46, the collision module 50, the data rate module 54, the duplex module 62 and the error module 58. This is because detection of duplex mismatch at the first network device 12 and corresponding operations are not dependent on operations of modules in the second network device 14.

Figure 2:
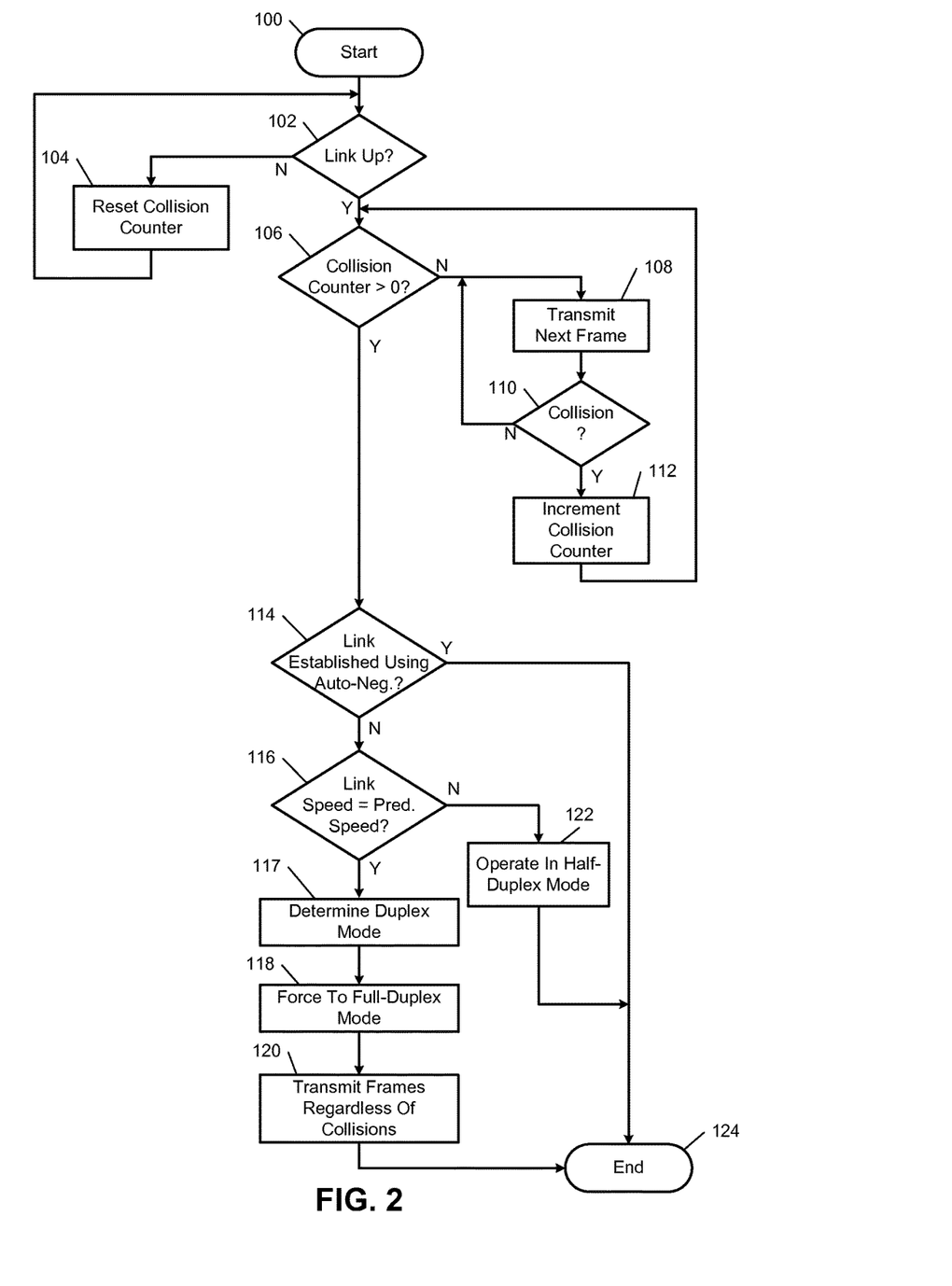
FIG. 2 illustrates a collision-based method of detecting duplex mismatch including duplex mode detection.
Figure 3:
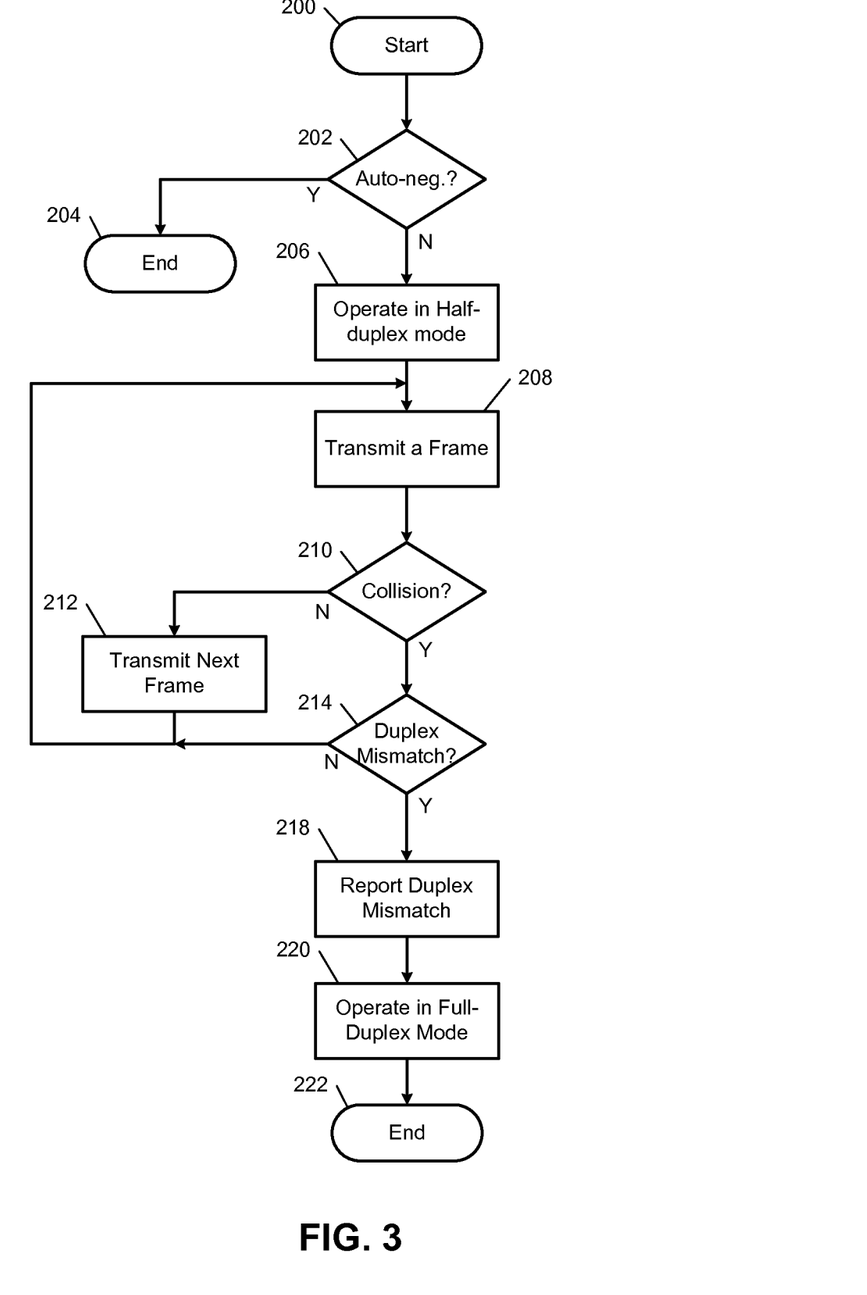
FIG. 3 illustrates a collision-based method of detecting duplex mismatch while operating in a half-duplex mode.
Figure 4:
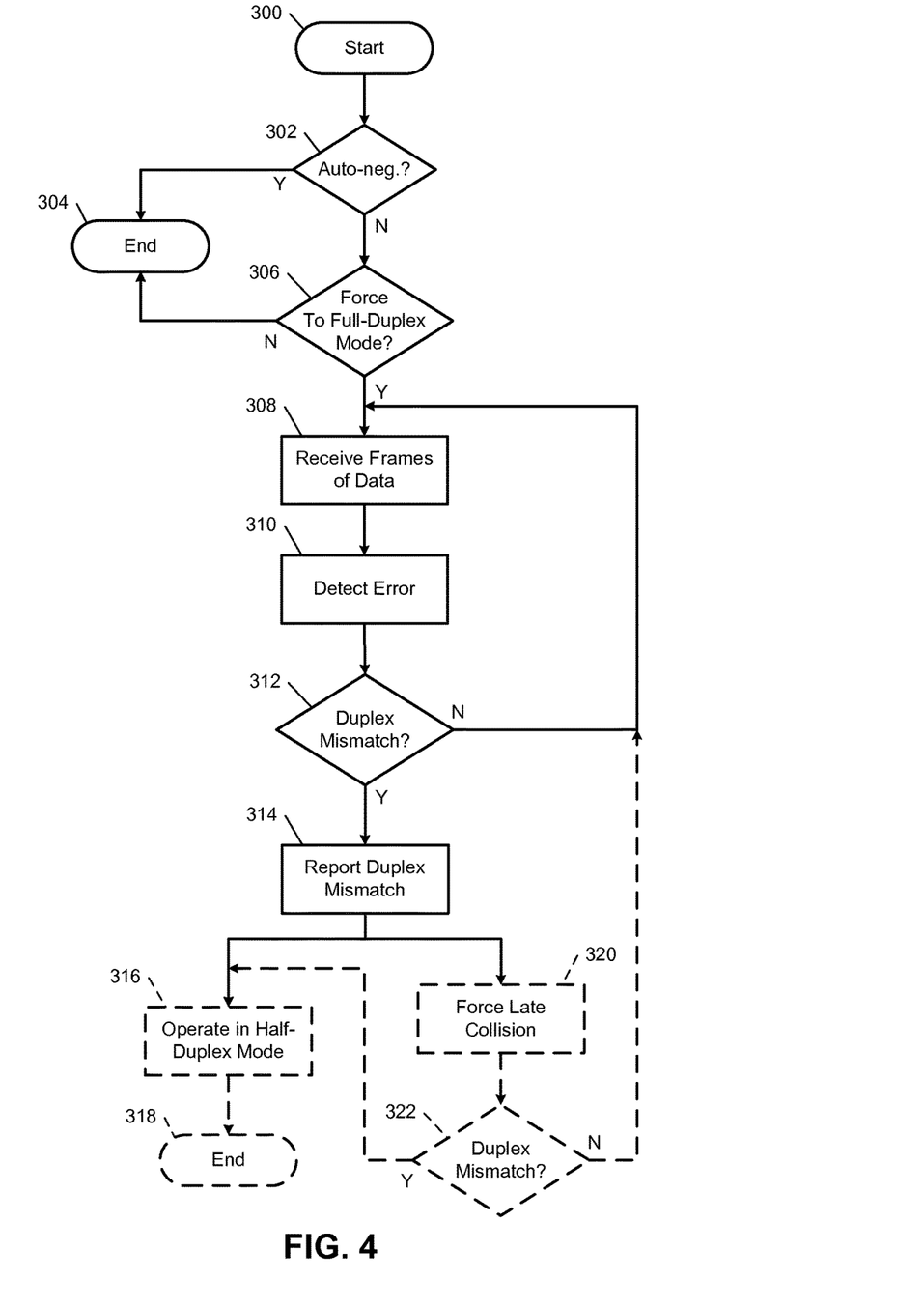
FIG. 4 illustrates an error-based method of detecting duplex mismatch while operating in a full-duplex mode.

The network system 10 and corresponding devices and modules may operate using numerous methods, example methods are illustrated in FIGS. 2-4. In FIG. 2, a collision-based method of detecting duplex mismatch including duplex mode detection is shown. Although the following tasks are primarily described with respect to the implementations of FIGS. 1-2, the tasks may be easily modified to apply to other implementations of the present disclosure. The tasks may be modified as further described below to include the tasks of FIGS. 3-4. Also, although the tasks are primarily described as being performed by the first network device 12, the tasks may also be performed by the second network device 14. The tasks of each of FIGS. 2-4 may be iteratively performed.

The method of FIG. 2 may begin at 100. At 102, the link module 44 may determine whether a link is up between the network devices 12, 14. The link is up when the network devices 12, 14 are powered ON, connected to each other, and in communication with each other. The link module 44 may generate a first parameter indicating whether the link is up, which may be stored in the memory 63.

Determining whether the link is up may include, for example, determining whether a valid carrier waveform has been received for a given speed transmitted between the network devices 12, 14. The link module 44 may determine whether the link is up by determining whether there is activity on the link and/or by checking a link flag 103 stored in one of the registers 36, 40 and/or in the memory 63. A link flag 105, similar to the link flag 103, may be stored in the memory 64. The link flag 103 may refer to one or more bits of the memory 63 allocated to indicating whether the link is up. The link flag 103 may be set HIGH when the link is up or may be set LOW when the link is down. The link may be up (i.e. established) without previously performing auto-negotiation and/or without previously performing a parallel detect procedure. If the link is down, task 104 is performed, otherwise task 106 is performed.

At 104, the collision module 48 may reset the collision counter 70 to zero based on the link being down. The link module 44 may indicate to the collision module 48 that the link is down or the collision module 48 may access the memory 63 to check the link flag 103. The link flag 103 may be stored in one of the registers 36, 40. At 106, the collision module 48 determines whether the collision counter 70 is greater than zero. This indicates whether there has been a collision. A collision refers to when the first network device 12 transmits a first frame while the second network device 14 transmits a second frame resulting in (i) a collision or interference between corresponding transmit signals, and/or cut-off of transmission by the first network device 12. The collision module 48 may generate a second parameter indicating whether a collision has occurred, which may be stored in the memory 63.

The collision module 48 may monitor the MAC registers 36 and the PHY registers 40 to determine when a collision has occurred. The collision module 48 increments the collision counter 70 when a collision has occurred. The control module 20 can determine whether a collision has occurred based on whether, for example, the MAC 24 or the PHY module 28 outputs the first frame while receiving the second frame. As an example, the collision module 48 may monitor the MAC registers 36 and determine whether the MAC 24 is (i) transferring the first frame to the PHY module 28, and (ii) during a same period of time, receiving the second frame from the PHY module 28. A collision can be detected based on and during transmission of a full frame or a portion of a frame. As an example, the collision may be detected during a first portion (e.g., 0-63 bytes) of a frame. This may be referred to as a collision. As another example, the collision may be detected during a second portion (e.g., during or after byte 64) of a frame. This may be referred to as a late collision.

If the collision counter 70 is not greater than zero, task 108 is performed, otherwise task 114 is performed. At 108, the transceiver 16 may transmit via the MAC 24 and the PHY module 28 a next frame. At 110, the collision module 48 may determine whether a collision has occurred with the next frame. At 112, the collision module 48 increments the collision counter 70 if a collision has occurred. Task 106 may be performed subsequent to task 112.

If the collision counter 70 is greater than or equal to one, then task 114 is performed. This allows a duplex mismatch to be detected based on a single collision. At 114, the auto-negotiation module 66 determines whether the link was established based on auto-negotiation between the first network device 12 and the second network device 14. This may include monitoring the PHY registers 40 to determine whether auto-negotiation has occurred successfully. In addition or alternatively, checking whether auto-negotiation has occurred successfully may include checking an auto-negotiation flag 113 stored in one of the registers 36, 40 and/or in the memory 63. The auto-negotiation flag 113 may be set by the auto-negotiation module 66 when auto-negotiation has been performed and successfully completed. The auto-negotiation flag 113 may be (i) set HIGH when auto-negotiation has been performed and successfully completed, and (ii) set LOW when auto-negotiation has not been performed and/or has not been successfully completed. An auto-negotiation flag 115, similar to the auto-negotiation flag 113, may be stored in the memory 64.

As a default, the first network device 12 may be initially operated in the half-duplex mode if auto-negotiation has not been performed successfully. The auto-negotiation module 66 may generate a third parameter indicating whether auto-negotiation has occurred and/or whether the auto-negotiation has occurred successfully. The third parameter may be stored in the memory 63.

At 116, the data rate module 52 is configured to determine whether data is being transmitted across the link at a predetermined speed (or data transmission rate). This may include determining, for example, whether (i) the first PHY module 28 is receiving data from the second PHY module 30 at the predetermined speed, or (ii) the first MAC 24 is receiving data from the first PHY module 28 at the predetermined speed. The predetermined speed may be associated with operating according to a certain IEEE standard or rule, such as Fast Ethernet, and/or may be associated with operating in the full-duplex mode. As an example, the predetermined speed may be 100 Mb/s. The data rate module 52 may generate a fourth parameter indicating whether the speed at which the data is being transmitted over the link (the data transmission rate of the link) is equal to or within a predetermined range of the predetermined speed. The fourth parameter may be stored in the memory 63. If the data transmission rate of the link is equal to or within a predetermined range of the predetermined speed, then task 117 is performed, otherwise task 122 may be performed.

At 117, the duplex module 60 may determine the duplex mode of the first network device 12 and/or the second network device 14. The duplex module 60 may determine the duplex module 60 based on one or more of the parameters generated by the link module 44, the collision module 48, the auto-negotiation module 66 and the data rate module 52.

If data is being transmitted over the link at the predetermined speed, than the first network device 12 is operating in the half-duplex mode and the second network device 14 is operating in the full-duplex mode. This is because the link is up, there has been a collision indicating a duplex mismatch, auto-negotiation has not been performed successfully, and the second network device 14 is transmitting at the predetermined speed associated with the full-duplex mode. To assure that the first network device 12 is operating in the half-duplex mode, the duplex module 60 may determine the duplex mode of the first network device 12 using one or more other techniques. As a first example, the PHY module 28 may indicate whether the first network device 12 is operating in the half-duplex mode or the full-duplex mode. As a second example, duplex mode flags 119 may be stored in the memory 63 and checked via the duplex module 60.

The duplex mode flags 119 may indicate the duplex modes of the network devices 12, 14. Duplex mode flags 121 indicating the duplex modes of the network devices 12, 14 may be stored in the memory 64.

At 118, the duplex module 60 transitions the first network device 12 including the first transceiver 16, the first MAC 24 and the first PHY module 28 from operating in the half-duplex mode to operating in the full duplex-mode. At 120, the first transceiver 16 transmits frames to the second network device 14 via the first MAC 24 and the first PHY module 28. The first transceiver 16 transmits the frames (i) regardless of whether the first PHY module 28 indicates operation of the first network device 12 or the second network device 14 in the half-duplex mode, and/or (ii) regardless of whether there are collisions between the frames being transmitted from the first transceiver 16 and frames being received from the second network device 14. At 122, the duplex module 60 maintains operation in the half-duplex mode.

Subsequent to tasks 120 and 122, the method may end at 124 as shown or may return to task 100. For example, the control module 20 may continue to monitor changes in the link between the network devices 12, 14. If the link is disrupted (or "goes down") and then is reestablished, task 100 may be performed and the method of FIG. 2 may be repeated. The disruption and reestablishing of the link may result in the first network device 12 transitioning from the full-duplex mode to the half-duplex mode. As another example, the method of FIG. 3 or a portion of the method of FIG. 3 may be performed subsequent to, for example, task 122. As yet another example, tasks 208-222 may be performed subsequent to task 122. The method of FIG. 4 may be performed prior to or subsequent to the method of FIG. 2.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events. For example, tasks 106-112 may be performed subsequent to tasks 114 and 116 and prior to tasks 118 and 122.

Embodiments of the present disclosure provide techniques for both ends of a link detecting duplex mismatch. If performed by a same network device (e.g., the first network device 12), the following techniques may be performed prior to and/or subsequent to the techniques described above. If performed by a different network device (link partner of the first network device 12 or the second network device 14), the following techniques may be performed prior to, during, and/or subsequent to the techniques described above.

A network device operating in the half-duplex mode may (i) detect a link partner operating in the full-duplex mode by detecting late collisions, and (ii) correct duplex mismatch by transitioning to the full-duplex mode. A late collision may be a collision that occurs and is detected after a threshold amount of data of a frame has been transmitted. For example, a collision that occurs after byte 64 of a frame may be considered a late collision. This is further described with respect to FIG. 3.

FIG. 3 illustrates a collision-based method of detecting duplex mismatch while operating in the half-duplex mode. Although the following tasks are primarily described with respect to the implementations of FIG. 1, the tasks may be easily modified to apply to other implementations of the present disclosure. Also, although the tasks are primarily described as being performed by the first network device 12, the tasks may also be performed by the second network device 14.

The method of FIG. 3 may begin at 200. At 202, the auto-negotiation module determines whether the link between the network devices 12, 14 was established using auto-negotiation. If the link was established using auto-negotiation and auto-negotiation was performed successfully, the method may end at 204, otherwise task 206 is performed. If auto-negotiation was performed successfully, then there is not a duplex mismatch problem.

At 206, the duplex module 60 transitions the first network device 12 to operating in the half-duplex mode. At 208, the transceiver 16 transmits a frame to the second network device 14. At 210, the collision module 48 determines whether a collision has occurred. Because the first network device 12 is operating in the half-duplex mode, if the first network device 12 transmits over the link while the second network device 14 transmits over the link, a collision occurs, which is detected by the collision module 48. If a collision has not occurred, task 212 is performed, otherwise task 216 is performed. At 212, the transceiver 16 transmits a next frame to the second network device 14.

At 216, the duplex module 60 determines whether a duplex mismatch condition exists between the network devices 12, 14. The duplex module 60 may determine that a duplex mismatch condition exists if a predetermined number of late collisions have occurred during a predetermined period of time. The duplex module 60 may determine a duplex mismatch condition exists if a number of late collisions (e.g., 1,000 late collisions) that occur during the predetermined period of time (e.g., 10 seconds) exceeds a predetermined threshold. The duplex module 60 may determine that a duplex mismatch condition exists if a "very late collision" has occurred. A very late collision may be a collision that occurs, for example, after a predetermined number of bytes (e.g., 256 bytes or 4 times the amount of bytes associated with a late collision) of a frame. If a duplex mismatch condition exists, task 218 is performed, otherwise task 208 may be performed.

At 218, the duplex module 60 may report a duplex mismatch indicating that the link partner is operating in the full-duplex mode. The reporting of the duplex mismatch may include set a duplex mismatch flag 219 in the memory 63 and transmitting a message to a system administrator. The duplex mismatch flag 219 may be stored in one of the registers 36, 40. A duplex mismatch flag 221, similar to the duplex mismatch flag 219, may be stored in the memory 64. At 220, the duplex module 60 may transition the first network device 12 to operating in the full-duplex mode. Subsequent to task 220, the method of FIG. 3 may end at 222.

As another example, a network device operating in the full-duplex mode may detect a link partner operating in the half-duplex mode. For example, the network device may detect errors associated with received frames due to collisions and based on these errors determine that a duplex mismatch condition exists. The network device may then transition to the half-duplex mode to correct the duplex mismatch condition. As another example, a network device operating in the full-duplex mode that detects a duplex mismatch may cause one or more very late collisions. As a result, a link partner of the network device may detect the duplex mismatch and transition to operating in the full-duplex mode to resolve the duplex mismatch. If the link partner does not change to full-duplex mode and the network device detects another late collision, the network device may then transition to the half-duplex mode to resolve duplex mismatch. These examples are further described below with respect to FIG. 4.

FIG. 4 illustrates an error-based method of detecting duplex mismatch while operating in the full-duplex mode. Although the following tasks are primarily described with respect to the implementations of FIG. 1, the tasks may be easily modified to apply to other implementations of the present disclosure. Also, although the tasks are primarily described as being performed by the first network device 12, the tasks may also be performed by the second network device 14.

The method of FIG. 4 may begin at 300. At 302, the auto-negotiation module 66 determines whether the link between the network devices 12, 14 was established using auto-negotiation. If the link was established using auto-negotiation and auto-negotiation was performed successfully, the method may end at 304, otherwise task 306 is performed. If auto-negotiation was performed successfully, then there is not a duplex mismatch problem.

At 306, the duplex module 60 transitions the first network device 12 to operating in full-duplex mode. To prevent another duplex mismatch condition due to both of the network devices 12, 14 transitioning between duplex modes during a same period of time, the duplex module 60 may wait a predetermined period of time before transitioning to the full-duplex mode. The control module 20 may then determine whether the second network device 14 has transitioned between duplex modes prior to transitioning to the full-duplex mode. This may include detecting whether a collision has occurred and/or determining whether there is an error in a received frame, as is further described below.

At 308, the transceiver 16 receives frames from the second network device 14. At 310, the error module 56 may determine whether there is an error associated with one or more of the received frames. The errors may include (i) cyclical redundancy check (CRC) errors, and/or (ii) reception of fragments of a frame. CRC errors may occur, for example, when the first network device 12 starts transmitting a first frame, indicating that collisions are corrupting the received frames. A CRC error may be detected, for example, when the transceiver 16 starts transmitting a preamble of a first frame to the second network device 14 (i) while receiving a portion of a second frame from the second network device 14, and (ii) prior to receiving a predetermined byte (e.g., a $64^{th}$ byte) of the second frame from the second network device 14. This is because the second network device 14 may be operating in the half-duplex mode and may stop transmitting while receiving data from the first network device 12, resulting in a CRC error and reception of a fragment of the second frame at the first network device 12. This bi-directional transmission can occur repetitively causing fragments of frames to be received and detected at the transceiver 16.

At 312, the duplex module 60 determines whether a duplex mismatch condition exists based on whether the error module 56 has detected one or more errors. If one or more errors have occurred, the duplex module 60 may determine that a duplex mismatch condition exists and may perform task 314, otherwise task 308 may be performed. At 314, the duplex module 60 may report the duplex mismatch as described above. Subsequent to task 314, task 316 may be performed or tasks 320 and 321 may be performed.

At 316, the duplex module 60 transitions the first network device 12 to the half-duplex mode. The method of FIG. 4 may end at 318 subsequent to performing task 316. At 320, the collision module 48 may force one or more late collisions. The late collisions may include one or more very late collisions. This may include transmitting a first frame, or at least a portion of the first frame (e.g., a preamble of the frame), subsequent to receiving a predetermined amount of data in the second frame and while receiving the second frame. The forced late collision provides the second network device 14 with an opportunity to detect the late collision and transition to the full-duplex mode.

At 322, the duplex module 60 again determines whether a duplex mismatch condition exists according to one or more of the above-described techniques for detecting a duplex mismatch. If duplex mismatch condition does not exist, task 308 may be performed, otherwise task 316 may be performed. Task 316 may be performed, for example, when the second network device 14 has transitioned to the full-duplex mode.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A OR B OR C), using a non-exclusive logical OR, and should not be construed to mean "at least one of A, at least one of B, and at least one of C." It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium include nonvolatile memory (such as flash memory), volatile memory (such as static random access memory and dynamic random access memory), magnetic storage (such as magnetic tape or hard disk drive), and optical storage.

The apparatuses and methods described in this application may be partially or fully implemented by one or more computer programs executed by one or more processors. The computer programs include processor-executable instructions that are stored on at least one non-transitory, tangible computer-readable medium. The computer programs may also include and/or rely on stored data.

What is claimed is:

1. A first network device comprising:
   a link circuit configured to generate a first parameter based on whether a link is established between the first network device and a second network device;
   a collision circuit configured to generate a second parameter based on whether a collision between transmitted signals has occurred as a result of (i) first data being transmitted from the first network device to the second network device while (ii) second data is transmitted from the second network device to the first network device;
   an auto-negotiation circuit configured to generate a third parameter based on whether an auto-negotiation procedure has been performed between the first network device and the second network device;
   a data rate circuit configured to generate a fourth parameter based on whether a transmission rate at which the first data is being transmitted over the link is equal to or within a predetermined range of a predetermined rate; and
   a duplex circuit configured to, based on the first parameter, the second parameter, the third parameter, and the fourth parameter (i) determine a duplex mode of the first network device, (ii) determine a duplex mode of the second network device, or (iii) transition the first network device between a half-duplex mode and a full-duplex mode.

2. The first network device of claim 1, wherein the auto-negotiation circuit is configured to generate the third parameter based on whether the auto-negotiation between the first network device and the second network device was performed successfully.

3. The first network device of claim 1, wherein the duplex circuit is configured to transition the first network device between the half-duplex mode and the full-duplex mode, if:
   the link is established between the first network device and the second network device;
   a collision between the transmitted signals has occurred;
   the auto-negotiation procedure has been performed; and
   the transmission rate is equal to or within the predetermined range of the predetermined rate.

4. The first network device of claim 1, wherein the duplex circuit is configured to maintain the first network device operating in the half-duplex mode, if:
   a collision between the transmitted signals has not occurred;
   the auto-negotiation procedure has not been performed successfully; or
   the transmission rate is not equal to or within the predetermined range of the predetermined rate.

5. The first network device of claim 1, wherein the predetermined rate is a rate at which data is transmitted either (i) from the first network device to the second network device while the first network device is operating in the full-duplex mode, or (ii) from the second network device to the first network device while the second network device is operating in the full-duplex mode.

6. The first network device of claim 1, wherein the duplex circuit is configured to determine the duplex mode of the first network device based on the first parameter, the second parameter, the third parameter and the fourth parameter.

7. The first network device of claim 1, wherein the duplex circuit is configured to, based on the first parameter, the second parameter, the third parameter and the fourth parameter, transition the first network device from the half-duplex mode to the full-duplex mode.

8. The first network device of claim 1, wherein the duplex circuit is configured to, based on the first parameter, the second parameter, the third parameter, and the fourth parameter, (i) determine the duplex mode of the first network device, (ii) determine the duplex mode of the second network device, and (iii) transition the first network device from the half-duplex mode to the full-duplex mode.

9. The first network device of claim 1, wherein:
the collision circuit is configured to generate the second parameter based on detection of only a single collision; and
the single collision corresponds to a frame being transmitted from the first network device to the second network device.

10. The first network device of claim 1, wherein:
the collision circuit is configured to (i) while a frame is being transmitted from the first network device to the second network device, detect the collision between the signals, and (ii) generate the second parameter, in response to the collision between the signals corresponding to a beginning portion of the frame; and
the collision circuit is configured to detect the collision between the signals regardless of whether the collision corresponds to an end portion of the frame.

11. A method comprising:
generating a first parameter based on whether a link is established between a first network device and a second network device;
generating a second parameter based on whether a collision between transmitted signals has occurred as a result of (i) first data being transmitted from the first network device to the second network device while (ii) second data is transmitted from the second network device to the first network device;
generating a third parameter based on whether an auto-negotiation procedure has been performed between the first network device and the second network device;
generating a fourth parameter based on whether a transmission rate at which the first data is being transmitted over the link is equal to or within a predetermined range of a predetermined rate; and
based on the first parameter, the second parameter, the third parameter, and the fourth parameter (i) determining a duplex mode of the first network device, (ii) determining a duplex mode of the second network device, or (iii) transitioning the first network device between a half-duplex mode and a full-duplex mode.

12. The method of claim 11, comprising generating the third parameter based on whether the auto-negotiation between the first network device and the second network device was performed successfully.

13. The method of claim 11, further comprising transitioning the first network device between the half-duplex mode and the full-duplex mode, if:
the link is established between the first network device and the second network device;
a collision between the transmitted signals has occurred;
the auto-negotiation procedure has been performed; and
the transmission rate is equal to or within the predetermined range of the predetermined rate.

14. The method of claim 11, further comprising maintaining the first network device in the half-duplex mode, if:
a collision between the transmitted signals has not occurred;
the auto-negotiation procedure has not been performed successfully; or
the transmission rate is not equal to or within the predetermined range of the predetermined rate.

15. The method of claim 11, wherein the predetermined rate is a rate at which data is transmitted either (i) from the first network device to the second network device while the first network device is operating in the full-duplex mode, or (ii) from the second network device to the first network device while the second network device is operating in the full-duplex mode.

16. The method of claim 11, further comprising determining the duplex mode of the first network device based on the first parameter, the second parameter, the third parameter and the fourth parameter.

17. The method of claim 11, further comprising, based on the first parameter, the second parameter, the third parameter and the fourth parameter, transitioning the first network device from the half-duplex mode to the full-duplex mode.

18. The method of claim 11, comprising based on the first parameter, the second parameter, the third parameter, and the fourth parameter, (i) determining the duplex mode of the first network device, (ii) determining the duplex mode of the second network device, and (iii) transitioning the first network device from the half-duplex mode to the full-duplex mode.

19. The method of claim 11, comprising generating the second parameter based on detection of only a single collision, wherein the single collision corresponds to a frame being transmitted from the first network device to the second network device.

20. The method of claim 11, wherein:
while a frame is being transmitted from the first network device to the second network device, detecting the collision between the signals;
generating the second parameter, in response to the collision between the signals corresponding to a beginning portion of the frame; and
detecting the collision between the signals regardless of whether the collision between the signals corresponds to an end portion of the frame.

* * * * *